US 9,859,797 B1

(12) United States Patent
Leabman

(10) Patent No.: US 9,859,797 B1
(45) Date of Patent: *Jan. 2, 2018

(54) SYNCHRONOUS RECTIFIER DESIGN FOR WIRELESS POWER RECEIVER

(71) Applicant: ENERGOUS CORPORATION, San Jose, CA (US)

(72) Inventor: Michael Leabman, San Ramon, CA (US)

(73) Assignee: Energous Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/584,901

(22) Filed: Dec. 29, 2014

Related U.S. Application Data

(63) Continuation-in-part of application No. 14/272,247, filed on May 7, 2014, now abandoned.

(51) Int. Cl.
H02M 3/158 (2006.01)
H02J 5/00 (2016.01)
(Continued)

(52) U.S. Cl.
CPC ............ *H02M 3/1588* (2013.01); *H02J 5/00* (2013.01); *H02J 7/025* (2013.01); *H02M 3/158* (2013.01); *H02M 7/217* (2013.01)

(58) Field of Classification Search
CPC .... H02M 3/1588; H02M 3/158; H02M 7/217; H02J 50/27; H02J 7/025
(Continued)

(56) References Cited

U.S. PATENT DOCUMENTS 787,412 A 4/1905 Tesla
3,434,678 A 3/1969 Brown et al.
(Continued)

FOREIGN PATENT DOCUMENTS

CN 203826555 U 9/2014
CN 104090265 A 10/2014
(Continued)

OTHER PUBLICATIONS

Panda et al. "SIW based Slot Array Antenna and Power Management Circuit for Wireless Energy Harvesting Applications", IEEE APSURSI, Jul. 2012.*
(Continued)

Primary Examiner — Kyle J Moody
(74) Attorney, Agent, or Firm — Morgan, Lewis & Bockius LLP

(57) ABSTRACT

Synchronous rectifier circuit topologies for a wireless power receiver receiving a supply of power from a wireless transmitter are disclosed. The synchronous rectifier circuit topologies include a half-bridge diode-FET transistor rectifier for rectifying the wireless power into power including a DC waveform, using a control scheme that may be provided by a delay-locked loop clock, or phase shifters, or wavelength links to control conduction of FET transistors in the synchronous rectifier circuit topology, and maintaining a constant switching frequency to have the diodes, coupled to FET transistors, to allow current to flow through each one respectively at the appropriate timing, focusing on high conduction times. The synchronous rectifier circuit topologies may enable power transfer of high-frequency signals at enhanced efficiency due to significant reduction of forward voltage drop and lossless switching.

19 Claims, 8 Drawing Sheets

(51) Int. Cl.
  *H02J 7/02* (2016.01)
  *H02M 7/217* (2006.01)

(58) Field of Classification Search
  USPC .......................... 363/21.06, 21.14; 307/104
  See application file for complete search history.

(56) References Cited

U.S. PATENT DOCUMENTS

| | | | |
|---|---|---|---|
| 3,696,384 A | 10/1972 | Lester | |
| 3,754,269 A | 8/1973 | Clavin | |
| 4,101,895 A | 7/1978 | Jones, Jr. | |
| 4,360,741 A | 11/1982 | Fitzsimmons et al. | |
| 4,944,036 A | 7/1990 | Hyatt | |
| 4,995,010 A | 2/1991 | Knight | |
| 5,200,759 A | 4/1993 | McGinnis | |
| 5,211,471 A | 5/1993 | Rohrs | |
| 5,548,292 A | 8/1996 | Hirshfield et al. | |
| 5,556,749 A | 9/1996 | Mitsuhashi et al. | |
| 5,568,088 A | 10/1996 | Dent et al. | |
| 5,646,633 A | 7/1997 | Dahlberg | |
| 5,697,063 A | 12/1997 | Kishigami et al. | |
| 5,712,642 A | 1/1998 | Hulderman | |
| 5,936,527 A | 8/1999 | Isaacman et al. | |
| 5,982,139 A | 11/1999 | Parise | |
| 6,046,708 A | 4/2000 | MacDonald, Jr. et al. | |
| 6,127,799 A | 10/2000 | Krishnan | |
| 6,127,942 A | 10/2000 | Welle | |
| 6,289,237 B1 | 9/2001 | Mickle et al. | |
| 6,329,908 B1 | 12/2001 | Frecska | |
| 6,421,235 B2 | 7/2002 | Ditzik | |
| 6,437,685 B2 | 8/2002 | Hanaki | |
| 6,456,253 B1 | 9/2002 | Rummeli et al. | |
| 6,476,795 B1 | 11/2002 | Berocher et al. | |
| 6,501,414 B2 | 12/2002 | Amdt et al. | |
| 6,583,723 B2 | 6/2003 | Watanabe et al. | |
| 6,597,897 B2 | 7/2003 | Tang | |
| 6,615,074 B2 | 9/2003 | Mickle et al. | |
| 6,664,920 B1 | 12/2003 | Mott et al. | |
| 6,798,716 B1 | 9/2004 | Charych | |
| 6,803,744 B1 | 10/2004 | Sabo | |
| 6,856,291 B2 | 2/2005 | Mickle et al. | |
| 6,911,945 B2 | 6/2005 | Korva | |
| 6,960,968 B2 | 11/2005 | Odendaal et al. | |
| 6,967,462 B1 | 11/2005 | Landis | |
| 6,988,026 B2 | 1/2006 | Breed et al. | |
| 7,003,350 B2 | 2/2006 | Denker et al. | |
| 7,027,311 B2 | 4/2006 | Vanderelli et al. | |
| 7,068,991 B2 | 6/2006 | Parise | |
| 7,183,748 B1 | 2/2007 | Unno et al. | |
| 7,191,013 B1 | 3/2007 | Miranda et al. | |
| 7,196,663 B2 | 3/2007 | Bolzer et al. | |
| 7,205,749 B2 | 4/2007 | Hagen et al. | |
| 7,222,356 B1 | 5/2007 | Yonezawa et al. | |
| 7,274,334 B2 | 9/2007 | o'Riordan et al. | |
| 7,274,336 B2 | 9/2007 | Carson | |
| 7,351,975 B2 | 4/2008 | Brady et al. | |
| 7,359,730 B2 | 4/2008 | Dennis et al. | |
| 7,392,068 B2 | 6/2008 | Dayan | |
| 7,403,803 B2 | 7/2008 | Mickle et al. | |
| 7,451,839 B2 | 11/2008 | Perlman | |
| 7,463,201 B2 | 12/2008 | Chiang et al. | |
| 7,614,556 B2 | 11/2009 | Overhultz et al. | |
| 7,639,994 B2 | 12/2009 | Greene et al. | |
| 7,643,312 B2 | 1/2010 | Vanderelli et al. | |
| 7,652,577 B1 | 1/2010 | Madhow et al. | |
| 7,702,771 B2 | 4/2010 | Ewing et al. | |
| 7,786,419 B2 | 8/2010 | Hyde et al. | |
| 7,812,771 B2 | 10/2010 | Greene et al. | |
| 7,830,312 B2 | 11/2010 | Choudhury et al. | |
| 7,844,306 B2 | 11/2010 | Shearer et al. | |
| 7,868,482 B2 | 1/2011 | Greene et al. | |
| 7,898,105 B2 | 3/2011 | Greene et al. | |
| 7,904,117 B2 | 3/2011 | Doan et al. | |
| 7,925,308 B2 | 4/2011 | Greene et al. | |
| 8,055,003 B2 | 11/2011 | Mittleman et al. | |
| 8,070,595 B2 | 12/2011 | Alderucci et al. | |
| 8,072,380 B2 | 12/2011 | Crouch | |
| 8,092,301 B2 | 1/2012 | Alderucci et al. | |
| 8,099,140 B2 | 1/2012 | Arai | |
| 8,115,448 B2 | 2/2012 | John | |
| 8,159,090 B2 | 4/2012 | Greene et al. | |
| 8,159,364 B2 | 4/2012 | Zeine | |
| 8,180,286 B2 | 5/2012 | Yamasuge | |
| 8,228,194 B2* | 7/2012 | Mickle ................. G06K 7/0008 340/538.14 |
| 8,264,101 B2 | 9/2012 | Hyde et al. | |
| 8,264,291 B2 | 9/2012 | Morita | |
| 8,278,784 B2 | 10/2012 | Cook et al. | |
| 8,284,101 B2 | 10/2012 | Fusco | |
| 8,310,201 B1 | 11/2012 | Wright | |
| 8,362,745 B2 | 1/2013 | Tinaphong | |
| 8,380,255 B2 | 2/2013 | Shearer et al. | |
| 8,410,953 B2 | 4/2013 | Zeine | |
| 8,411,963 B2 | 4/2013 | Luff | |
| 8,432,062 B2 | 4/2013 | Greene et al. | |
| 8,432,071 B2 | 4/2013 | Huang et al. | |
| 8,446,248 B2 | 5/2013 | Zeine | |
| 8,447,234 B2 | 5/2013 | Cook et al. | |
| 8,451,189 B1 | 5/2013 | Fluhler | |
| 8,452,235 B2 | 5/2013 | Kirby et al. | |
| 8,457,656 B2 | 6/2013 | Perkins et al. | |
| 8,461,817 B2 | 6/2013 | Martin et al. | |
| 8,467,733 B2 | 6/2013 | Leabman | |
| 8,552,597 B2 | 10/2013 | Song et al. | |
| 8,558,661 B2 | 10/2013 | Zeine | |
| 8,560,026 B2 | 10/2013 | Chanterac | |
| 8,604,746 B2 | 12/2013 | Lee | |
| 8,614,643 B2 | 12/2013 | Leabman | |
| 8,621,245 B2 | 12/2013 | Shearer et al. | |
| 8,626,249 B2 | 1/2014 | Kuusilinna et al. | |
| 8,629,576 B2 | 1/2014 | Levine | |
| 8,653,966 B2 | 2/2014 | Rao et al. | |
| 8,674,551 B2 | 3/2014 | Low et al. | |
| 8,686,685 B2 | 4/2014 | Moshfeghi | |
| 8,712,355 B2 | 4/2014 | Black et al. | |
| 8,712,485 B2 | 4/2014 | Tam | |
| 8,718,773 B2 | 5/2014 | Wills et al. | |
| 8,729,737 B2 | 5/2014 | Schatz et al. | |
| 8,736,228 B1 | 5/2014 | Freed et al. | |
| 8,770,482 B2 | 7/2014 | Ackermann et al. | |
| 8,772,960 B2 | 7/2014 | Yoshida | |
| 8,823,319 B2 | 9/2014 | Von Novak, III et al. | |
| 8,854,176 B2 | 10/2014 | Zeine | |
| 8,860,364 B2 | 10/2014 | Low et al. | |
| 8,897,770 B1 | 11/2014 | Frolov et al. | |
| 8,923,189 B2 | 12/2014 | Leabman | |
| 8,928,544 B2 | 1/2015 | Massie et al. | |
| 8,937,408 B2 | 1/2015 | Ganem et al. | |
| 8,946,940 B2 | 2/2015 | Kim et al. | |
| 8,963,486 B2 | 2/2015 | Kirby et al. | |
| 8,970,070 B2 | 3/2015 | Sada et al. | |
| 8,989,053 B1 | 3/2015 | Skaaksrud et al. | |
| 9,000,616 B2 | 4/2015 | Greene et al. | |
| 9,001,622 B2 | 4/2015 | Perry | |
| 9,006,934 B2 | 4/2015 | Kozakai et al. | |
| 9,021,277 B2 | 4/2015 | Shearer et al. | |
| 9,030,161 B2 | 5/2015 | Lu et al. | |
| 9,059,598 B2 | 6/2015 | Kang et al. | |
| 9,059,599 B2 | 6/2015 | Won et al. | |
| 9,077,188 B2 | 7/2015 | Moshfeghi | |
| 9,088,216 B2 | 7/2015 | Garrity et al. | |
| 9,124,125 B2 | 9/2015 | Leabman et al. | |
| 9,130,397 B2 | 9/2015 | Leabman et al. | |
| 9,130,602 B2 | 9/2015 | Cook | |
| 9,142,998 B2 | 9/2015 | Yu et al. | |
| 9,143,000 B2 | 9/2015 | Leabman et al. | |
| 9,143,010 B2 | 9/2015 | Urano | |
| 9,178,389 B2 | 11/2015 | Hwang | |
| 9,225,196 B2* | 12/2015 | Huang .................... H02J 7/025 |
| 9,242,411 B2 | 1/2016 | Kritchman et al. | |
| 9,244,500 B2 | 1/2016 | Cain et al. | |
| 9,252,628 B2 | 2/2016 | Leabman et al. | |
| 9,270,344 B2 | 2/2016 | Rosenberg | |
| 9,282,582 B1 | 3/2016 | Dunsbergen et al. | |

(56) References Cited

U.S. PATENT DOCUMENTS

| | | |
|---|---|---|
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,590,444 B2 | 3/2017 | Walley |
| 9,620,996 B2 | 4/2017 | Zeine et al. |
| 2002/0001307 A1 | 1/2002 | Nguyen et al. |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0113543 A1 | 6/2004 | Daniels |
| 2004/0119675 A1 | 6/2004 | Washio et al. |
| 2004/0107641 A1 | 7/2004 | Walton et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0116683 A1 | 6/2005 | Cheng |
| 2005/0117660 A1 | 6/2005 | Vialle et al. |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0136004 A1 | 6/2006 | Cowan et al. |
| 2006/1195232 | 6/2006 | Yun et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0273486 A1 | 11/2007 | Shiotsu |
| 2007/0298846 A1 | 12/2007 | Greene et al. |
| 2008/0014897 A1 | 1/2008 | Cook et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0248758 A1 | 10/2008 | Schedelbeck et al. |
| 2008/0248846 A1 | 10/2008 | Stronach et al. |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |

(56) References Cited

U.S. PATENT DOCUMENTS

| | | |
|---|---|---|
| 2009/0291634 A1 | 11/2009 | Saarisalo |
| 2009/0299175 A1 | 12/2009 | Bernstein et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090656 A1 | 4/2010 | Shearer et al. |
| 2010/0109443 A1* | 5/2010 | Cook .................. H01Q 1/2225 307/104 |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0151808 A1 | 6/2010 | Toncich et al. |
| 2010/0156721 A1 | 6/2010 | Alamouti et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1* | 3/2012 | Kim .................... H02M 7/217 363/127 |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0074891 A1 | 3/2012 | Anderson et al. |
| 2012/0231856 A1 | 3/2012 | Lee et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |

(56) References Cited

U.S. PATENT DOCUMENTS

| | | |
|---|---|---|
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0212072 A1 | 8/2012 | Miyabayashi et al. |
| 2012/0214536 A1 | 8/2012 | Kim et al. |
| 2012/0200399 A1 | 9/2012 | Chae |
| 2012/0228956 A1 | 9/2012 | Kamata |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0049471 A1 | 2/2013 | Oleynik |
| 2013/0049475 A1 | 2/2013 | Kim et al. |
| 2013/0057078 A1 | 3/2013 | Lee |
| 2013/0057205 A1 | 3/2013 | Lee et al. |
| 2013/0057210 A1 | 3/2013 | Nergaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0178253 A1 | 7/2013 | Karaoguz |
| 2013/0181881 A1 | 7/2013 | Christie et al. |
| 2013/0193769 A1 | 8/2013 | Mehta et al. |
| 2013/0197320 A1 | 8/2013 | Albert et al. |
| 2013/0200064 A1 | 8/2013 | Clayton |
| 2013/0207477 A1 | 8/2013 | Nam et al. |
| 2013/0207604 A1 | 8/2013 | Zeine |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1* | 1/2014 | Leabman ............... H01F 38/14 307/104 |
| 2014/0008993 A1 | 1/2014 | Leabman |
| 2014/0009108 A1* | 1/2014 | Leabman ............... H02J 17/00 320/107 |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0049422 A1 | 2/2014 | Von Novak et al. |
| 2014/0055098 A1 | 2/2014 | Lee et al. |
| 2014/0057618 A1 | 2/2014 | Zirwas et al. |
| 2014/0062395 A1 | 3/2014 | Kwon et al. |

(56) References Cited

U.S. PATENT DOCUMENTS

| | | |
|---|---|---|
| 2014/0086125 A1 | 3/2014 | Polo et al. |
| 2014/0091756 A1 | 4/2014 | Ofstein et al. |
| 2014/0091968 A1 | 4/2014 | Harel et al. |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0175893 A1 | 6/2014 | Sengupta et al. |
| 2014/0176054 A1 | 6/2014 | Porat et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015192 A1* | 1/2015 | Leabman ............... H02J 7/025 320/108 |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0029397 A1 | 1/2015 | Leabman et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0108848 A1* | 4/2015 | Joehren ............... H03J 5/244 307/104 |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0222126 A1 | 8/2015 | Leabman et al. |
| 2015/0236520 A1 | 8/2015 | Baarman |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1* | 9/2015 | Walley ............... H01F 38/14 307/104 |
| 2015/0263534 A1* | 9/2015 | Lee ............... H02M 7/219 307/104 |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1* | 11/2015 | Petras ............... H02J 17/00 307/104 |
| 2015/0326070 A1* | 11/2015 | Petras ............... H02J 7/02 307/104 |
| 2015/0326072 A1* | 11/2015 | Petras ............... H02J 7/025 307/31 |
| 2015/0326142 A1* | 11/2015 | Petras ............... H02J 17/00 307/104 |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |

(56) References Cited

U.S. PATENT DOCUMENTS

| | | |
|---|---|---|
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054396 A1* | 2/2016 | Bell ................. G01R 31/40 324/764.01 |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0099601 A1* | 4/2016 | Leabman ............ H02J 50/40 307/104 |
| 2016/0099602 A1 | 4/2016 | Leabman et al. |
| 2016/0099609 A1 | 4/2016 | Leabman et al. |
| 2016/0099610 A1* | 4/2016 | Leabman ............ H02J 17/00 307/104 |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181867 A1* | 6/2016 | Daniel ................. H01Q 9/16 307/104 |
| 2016/0181873 A1* | 6/2016 | Mitcheson ........... H01Q 1/248 307/104 |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005516 A9 | 1/2017 | Leabman et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0085120 A1 | 3/2017 | Leabman et al. |
| 2017/0085437 A1 | 3/2017 | Condeixa et al. |
| 2017/0092115 A1 | 3/2017 | Sloo et al. |

FOREIGN PATENT DOCUMENTS

| | | |
|---|---|---|
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 | 9/2011 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 200111716 A1 | 2/2001 |
| WO | 03091943 A1 | 11/2003 |
| WO | 2004077550 A1 | 9/2004 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | WO 2010138994 A1 | 12/2010 |
| WO | 2011112022 A2 | 9/2011 |
| WO | WO 2012177283 A1 | 12/2012 |
| WO | 2013035190 A1 | 3/2013 |
| WO | WO 2013031988 A1 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016048512 A1 | 3/2016 |
| WO | WO 2016187357 A1 | 11/2016 |

OTHER PUBLICATIONS

International Search Report dated Sep. 12, 2014 corresponding to International Patent Application No. PCT/US2014/037072, 3 pages.
International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
Energous Corp., IPRP, PCT/US2014/046956, dated Jan. 19, 2016, 7 pgs.
Energous Corp., IPRP, PCT/US2015/067291, dated Jul. 4, 2017, 4 pgs.
Energous Corp., IPRP, PCT/US2015/067242, dated Jun. 27, 2017, 7 pgs.
Energous Corp., IPRP, PCT/US2015/067243, dated Jun. 27, 2017, 7 pgs.
Energous Corp., IPRP, PCT/US2015/067275, dated Jul. 4, 2017, 7 pgs.
Energous Corp., IPRP, PCT/US2015/067245, dated Jun. 27, 2017, 7 pgs.
Energous Corp., IPRP, PCT/US2014/041546, dated Dec. 29, 2015, 9 pgs.
Energous Corp., IPRP, PCT/US2015/67250, dated Mar. 30, 2016, 10 pgs.
Energous Corp., IPRP, PCT/US2015/067325, dated Jul. 4, 2017, 8 pgs.
Energous Corp., IPRP, PCT/US2015/067249, dated Jun. 27, 2017, 7 pgs.

(56) References Cited

OTHER PUBLICATIONS

Energous Corp., IPRP, PCT/US2015/067246, dated Jun. 27, 2017, 9 pgs.
Energous Corp., IPRP, PCT/US2015/067279, dated Jul. 4, 2017, 7 pgs.
Energous Corp., IPRP, PCT/US2015/067282, dated Jul. 4, 2017, 6 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP, PCT/US2014/045237, dated Jan. 12, 2016, 12 pgs.
Energous Corp., ISRWO, PCT/US2014/054897, dated Feb. 17, 2015, 10 pgs.
Energous Corp., IPRP, PCT/US2014/054897, dated Mar. 15, 2016, 8 pgs.
Energous Corp., ISRWO, PCT/US2015/067334, dated Mar. 3, 2016, 6 pgs.
Energous Corp., IPRP, PCT/US2015/067334, dated Jul. 4, 2017, 5 pgs.
Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO, PCT/US2014/054891, dated Dec. 18, 2014, 12 pgs.
Energous Corp., IPRP, PCT/US2014/054891, dated Mar. 15, 2016, 10 pgs.
Energous Corp., ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO, PCT/US2015/067294, dated Mar. 29, 2016, 7 pgs.
Energous Corp., IPRP, PCT/US2015/067294, dated Jul. 4, 2017, 6 pgs.
Energous Corp., ISRWO, PCT/US2014/062672 dated Jan. 26, 2015, 11 pgs.
Energous Corp., IPRP, PCT/US2014/062672 dated May 10, 2016, 8 pgs.
Energous Corp., ISRWO, PCT/US2014/044810 dated Oct. 21, 2014, 12 pgs.
Energous Corp., IPRP, PCT/US2014/044810, dated Jan. 5, 2016, 10 pgs.
Energous Corp., ISRWO, PCT/US2015/067271, dated Mar. 11, 2016, 6 pgs.
Energous Corp., IPRP, PCT/US2015/067271, dated Jul. 4, 2017, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316 , dated Mar. 16, 2017, 15 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24 1994. Abstract.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antenna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Energous Corp., Written Opinion, PCT/US2014/037170, dated Sep. 15, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2014/041534, dated Dec. 29, 2015, 7 pgs.
Energous Corp., Written Opinion, PCT/US2014/037072, dated Sep. 12, 2014, 5 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.

(56) References Cited

OTHER PUBLICATIONS

Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/67287, Feb. 2, 2016, 9 pgs.
Energous Corp., ISRWO, PCT/US2015/67291, dated Mar. 4, 2016, 10 pgs.
Energous Corp., ISRWO, PCT/US2015/67242, dated Mar. 16, 2016, 9 pgs.
Energous Corp., ISRWO, PCT/US2015/67243, dated Mar. 10, 2016, 11 pgs.
Energous Corp., ISRWO, PCT/US2014/037109, dated Apr. 8, 2016, 12 pgs.
Energous Corp., IPRP, PCT/US2014/037109, dated Apr. 12, 2016, 9 pgs.
Energous Corp., ISRWO, PCT/US2015/67275, dated Mar. 3, 2016, 8 pgs.
Energous Corp., ISRWO, PCT/US2015/067245, dated Mar. 17, 2016, 13 pgs.
Energous Corp., ISRWO, PCT/US2014/041546, dated Oct. 16, 2014, 12 pgs.
Energous Corp., ISRWO, PCT/US2015/67250, dated Mar. 30, 2016, 11 pgs.
Energous Corp., ISRWO, PCT/US2015/067325, dated Mar. 10, 2016, 9 pgs.
Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., ISRWO, PCT/US2015/067246, dated May 11, 2016, 12 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Jan. 26, 2016, 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 10 pgs.
Energous Corp., IPRP, PCT/US2014/059340, dated Jan. 15, 2015, 11 pgs.
Energous Corp., ISRWO, PCT/US2015/067282, Jul. 5, 2016, 7 pgs.
Supplementary European Search Report, EP Patent Application No. EP14818136-5, dated Jul. 21, 2016, 9 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybermetics vol. 43, No. 5. pp. 1318-1334.

\* cited by examiner

SYNCHRONOUS RECTIFIER DESIGN FOR WIRELESS POWER RECEIVER

CROSS-REFERENCE TO RELATED APPLICATIONS

This application is a continuation-in-part of U.S. patent application Ser. No. 14/272,247, filed May 7, 2014, which is herein fully incorporated by reference in its entirety for all purposes.

The present application is related to U.S. patent application Ser. No. 13/891,430, filed May 10, 2013; U.S. patent application Ser. No. 13/946,082, filed Jul. 19, 2013; U.S. patent application Ser. No. 13/891,399, filed May 10, 2013; U.S. patent application Ser. No. 13/891,445, filed May 10, 2013; and U.S. patent application Ser. No. 14/272,179, filed May 7, 2014; U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming," all of which are fully incorporated herein by reference in their entirety for all purposes.

FIELD OF THE DISCLOSURE

This disclosure relates generally to wireless power transmission, and more particularly to a half-bridge synchronous rectifier design using circuit topologies with low power loss characteristics for a wireless power receiver.

BACKGROUND

A plurality of electronic devices are powered via rechargeable batteries. Such devices include smartphones, portable gaming devices, tablet computers, portable music players, laptop computers, computer peripheral devices, communication devices (e.g., Bluetooth devices), digital cameras, and hearing aids, amongst others. While battery technology has improved, battery-powered electronic devices increasingly require and consume greater amounts of power, thereby often requiring recharging. Rechargeable devices are often charged via wired connections through cables or other similar connectors that are physically connected to a power supply.

Wireless charging technology has been developed and used for electronic devices in an effort to solve problems presented by wired charging solutions, such as contamination of contact terminals and moisture preventing the appropriate charging of the battery in the electronic device. Wireless charging systems may be capable of transferring power in free space and provide power to electronic devices or can be used to charge rechargeable electronic devices. Wireless power transmission is performed through a transmitter and a receiver coupled to the electronic device to be charged. The receiver antenna collects the radiated power from the transmitter and rectifies it for charging the battery.

Power converters are used to interface between power sources and electronic devices. Because alternating current is preferred for efficient power transmission, power sources typically provide power at alternating current. On the other hand the operation of many electronic devices requires direct current. In order to provide direct current for such devices from alternating current provided by the power sources, power converters need to convert the current supplied from alternating to direct, and use rectifiers for this purpose.

Half-bridge rectifiers are commonly used in power converters to provide half-wave rectification of alternating current. A typical half-bridge rectifier include two diodes which are inherently inefficient conductors producing a number of well-known problems. One problem resulting from the inefficiency of diodes is that they produce a forward voltage drop. This is most noticeable in low-voltage power converters where the voltage drop may be a significant proportion of the desired voltage output. Schottky diodes, which exhibit very low voltage drops, are often used to minimize the problem, but are an expensive solution. Conventional half-wave bridge rectifiers utilize junction diodes which show a forward bias voltage drop of approximately 0.7V. Thus, for a half-wave bridge rectifier, the resulting voltage drop relative to the input voltage can be as high as 1.4 volts. Another problem results from the heat dissipated by diodes, particularly in high frequency switching power supplies. Apart from reducing overall efficiency of the power converter, resulting high temperatures also reduce the reliability of components. Thus, additional design effort may be required to overcome the problems, and other factors such as the dimensions of the system may be affected as a result.

As such, there is a need for synchronous rectifiers characterized by low power loss characteristics and low associated heat loss for wireless power transfer systems that efficiently and safely transfer power at varying power levels to increase power transmission efficiency to electronic devices.

SUMMARY

According to embodiments, it is an object of the present disclosure to provide synchronous rectifier (SR) circuit topologies designed for wireless power transmission receivers of a plurality of system configuration and power transfer control schemes. The design of SR circuit topologies of present disclosure may include a plurality of switching control schemes for power conversion where the voltage output from a wireless transmitter is received by a wireless receiver antenna array and may be transferred output voltage for other modules in the wireless receiver when the SR is conductive.

The plurality of SR circuit topologies may be designed to be low cost, complexity and size, in which diode conduction may be limited and capable of operating at high switching frequencies to reduce reverse recovery losses and voltage stresses, enabling low power loss characteristics of the disclosed SR circuit topologies.

Since the voltage drop across a controlled rectifier is smaller than the voltage drop across an uncontrolled rectifier, the output voltage may undergo a transient if the controlled rectifier is suddenly enabled. To avoid the transient, the controlled rectifiers may be turned on with a slowly changing average on-state voltage during a conduction time that may be a portion of the overall switching cycle. In order to accomplish these and other objects of the present disclosure, the plurality of switching control schemes may include methods of controlling the synchronous rectifier with switching FET transistors which may control conduction of the synchronous rectifier in accordance with the level of voltage and frequency that may be detected at the input terminals, providing phase-shifted signals for the FET transistors to allow conduction and transfer of the converted power with a significant reduction of forward voltage drop and power losses.

Accordingly, in an embodiment, a control-driven synchronous rectifier circuit topology may be enabled using a delay-locked loop (DLL) clock to control switching of FET transistors in the synchronous rectifier and to provide a practically lossless switching and reduced forward voltage drop improving efficiency of power transfer. In this embodiment, conduction control of synchronous rectification may be enabled for a plurality of high-frequency signals received from a wireless transmitter including a level of high-frequency signals which may be within the 900 MHz, 2.4 GHz, and 5.7 GHz unlicensed bands. The task of implementing control-driven SR may require accurate timing adjustment algorithms that can be designed discretely, but are much simpler when integrated into an integrated circuit solution, such as a delay-locked loop.

In an another aspect of present disclosure a synchronous rectifier circuit topology may be enabled using phase shifters to provide a significantly less loss switching and reduced forward voltage drop improving efficiency of power transfer. In this synchronous rectifier circuit topology, FET transistors may be driven by gate-drive signals derived from the phase shifters for conduction control of synchronous rectification of a plurality of high-frequency signals received from wireless transmitter. In present embodiment, the level of high-frequency signals may be within the 900 MHz, 2.4 GHz, and 5.7 GHz unlicensed bands.

In yet another aspect, present disclosure may include a synchronous rectifier circuit topology using a switching control scheme provided by wavelength links, which may be added as a frequency-division demultiplexing of the signal received by the antenna element of a wireless power receiver from a wireless transmitter. Wavelength links may be of different wavelength spacing in order to have the required phase shifting to enable switching control of FET transistors and to provide the proper timing for current to flow through diodes coupled to FET transistors. The focus on high conduction times per switching control scheme required provides a significantly less loss switching and reduced forward voltage drop improving efficiency of power transfer.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being place upon illustrating the principles of the disclosure. In the figures, reference numerals designate corresponding parts throughout the different views.

DETAILED DESCRIPTION

Figure 1:
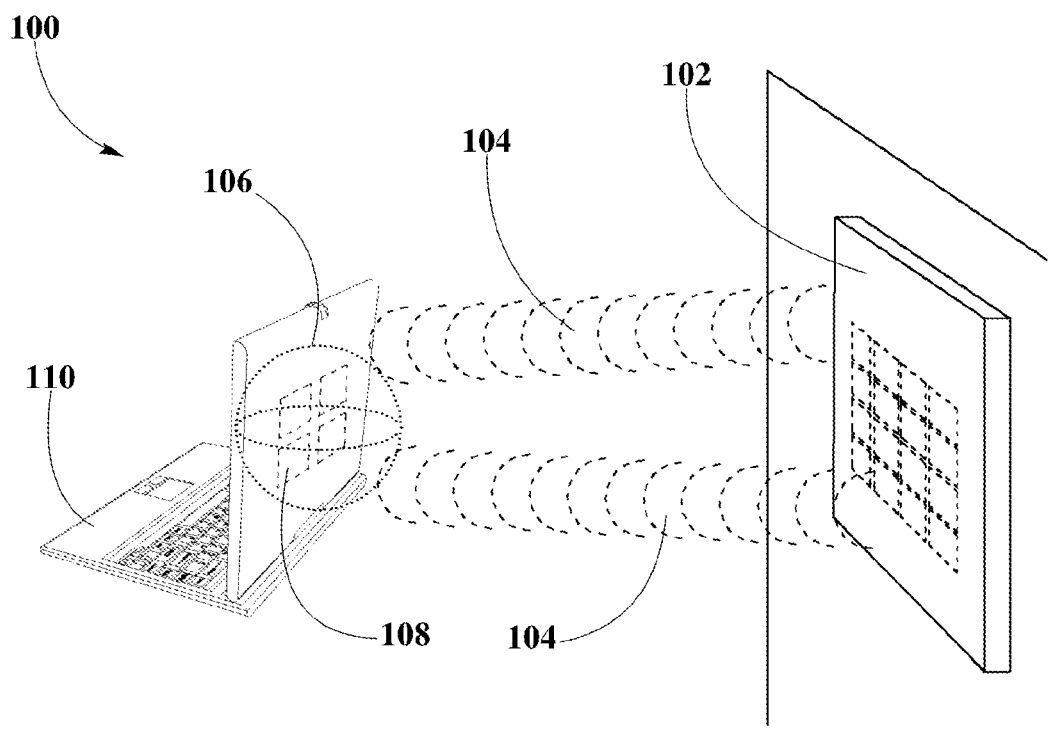
FIG. 1 illustrates wireless power transmission using pocket forming, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Wireless device" refers to any electronic device able to communicate using one or more suitable wireless technologies. Suitable devices may include client devices in wireless networks and may be part of one or more suitable wireless technologies, including Wi-Fi and Bluetooth amongst others.

"Wireless transmitter" refers to a device, including a chip which may generate two or more RF signals, at least one RF signal being phase shifted and gain adjusted with respect to other RF signals substantially, all of which pass through one or more RF antenna such that focused RF signals are directed to a target.

"Wireless receiver" refers to a device including at least one antenna element, at least one rectifying circuit and at least one power converter, which may utilize pockets of energy for powering, or charging a wireless device.

"Pocket-forming" may refer to generating two or more RF waves which converge in 3-d space, forming controlled constructive and destructive interference patterns.

"Adaptive pocket-forming" may refer to dynamically adjusting pocket-forming to regulate power on one or more targeted receivers.

"Synchronous rectifier" refers to a power transmission circuit including active rectifiers controlled by switches such as transistors for improving the efficiency of rectification. The control circuitry for active rectification usually uses sensors for the voltage of the input AC to open the transistors at the correct times to allow current to flow in the correct direction.

"FET transistor" refers to a switch used to open or close an analog or digital circuit.

"Delay-locked loop clock" refers to a digital circuit used to change the phase of a clock signal with a periodic waveform to enhance timing characteristics of integrated circuits.

The present disclosure may provide synchronous rectifier (SR) circuit topologies designed for wireless power transmission receivers of a plurality of system configuration and power transfer control schemes. The design of SR circuit topologies of present disclosure may include a plurality of switching control schemes for power conversion where the voltage output from a wireless transmitter is received by a wireless receiver antenna array and may be transferred output voltage for other modules in the wireless receiver when the SR is conductive.

Wireless Power Transmission System Hardware Configuration

FIG. 1 illustrates a wireless power transmission 100 using pocket-forming. A transmitter 102 may transmit controlled Radio Frequency (RF) waves 104 which may converge in 3-d space. These RF waves 104 may be controlled through phase and/or relative amplitude adjustments to form constructive and destructive interference patterns (pocket-forming). Pockets of energy 106 may be formed at constructive interference patterns and can be 3-dimensional in shape, while null-spaces may be generated at destructive interference patterns. A receiver 108 may then utilize pockets of energy 106 produced by pocket-forming for charging or powering a cordless electronic device 110, for example, a smartphone, a tablet, a laptop computer (as shown in FIG. 1), a music player, an electronic toy, and the like. In some embodiments, there can be multiple transmitters 102 and/or multiple receivers 108 for powering various electronic devices 110 at the same time. In other embodiments, adaptive pocket-forming may be used to regulate the power transmitted to electronic devices 110.

Figure 2:
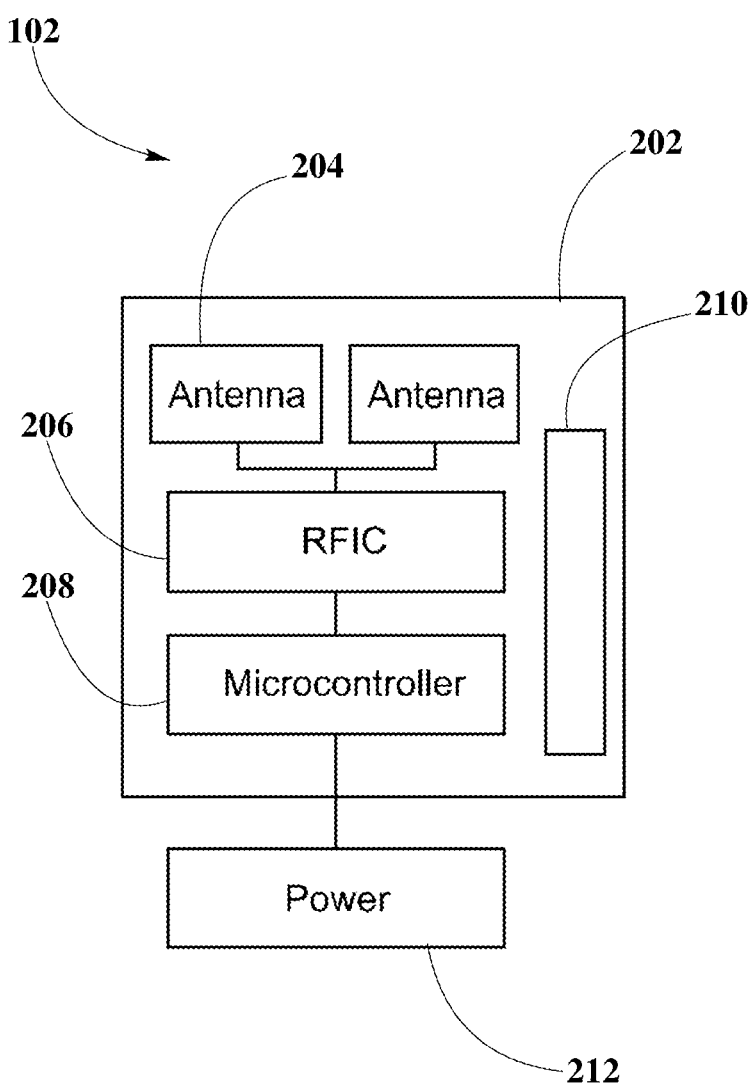
FIG. 2 depicts a block diagram of a transmitter, which may be used for wireless power transmission systems, according to an embodiment.

FIG. 2 depicts the block diagram of transmitter 102 which may be used in wireless power transmission 100. Transmitter 102 may include a housing 202, at least two or more antenna elements 204, at least one RF integrated circuit (RFIC) 206, at least one digital signal processor (DSP) or micro-controller 208, and one communications component 210. Housing 202 can be made of any suitable material which may allow for signal or wave transmission and/or reception, for example plastic or hard rubber. Antenna elements 204 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 204 may include vertical or horizontal polarization, right hand or left hand polarization, elliptical polarization, or other suitable polarizations as well as suitable polarization combinations. Suitable antenna types may include, for example, patch antennas with heights from about ⅛ of an inch to about 8 inches and widths from about ⅛ of an inch to about 6 inches. Other antenna elements 204 types that may be used include meta-materials based antennas, dipole antennas, and planar inverted-F antennas (PIFAs), amongst others.

RFIC 206 may include a proprietary chip for adjusting phases and/or relative magnitudes of RF signals which may serve as inputs for antenna elements 204 for controlling pocket-forming. These RF signals may be produced using a power source 212 and a local oscillator chip (not shown) using a suitable piezoelectric material. Micro-controller 208 may then process information sent by receiver 108 through communications component 210 for determining optimum times and locations for pocket-forming. Communications component 210 may be based on standard wireless communication protocols which may include Bluetooth, Wi-Fi or ZigBee. In addition, communications component 210 may be used to transfer other information, such as an identifier for the device or user, battery level, location, or other such information. Other communications components 210 may be possible, including radar, infrared cameras or sound devices for sonic triangulation of electronic device 110 position.

Figure 3:
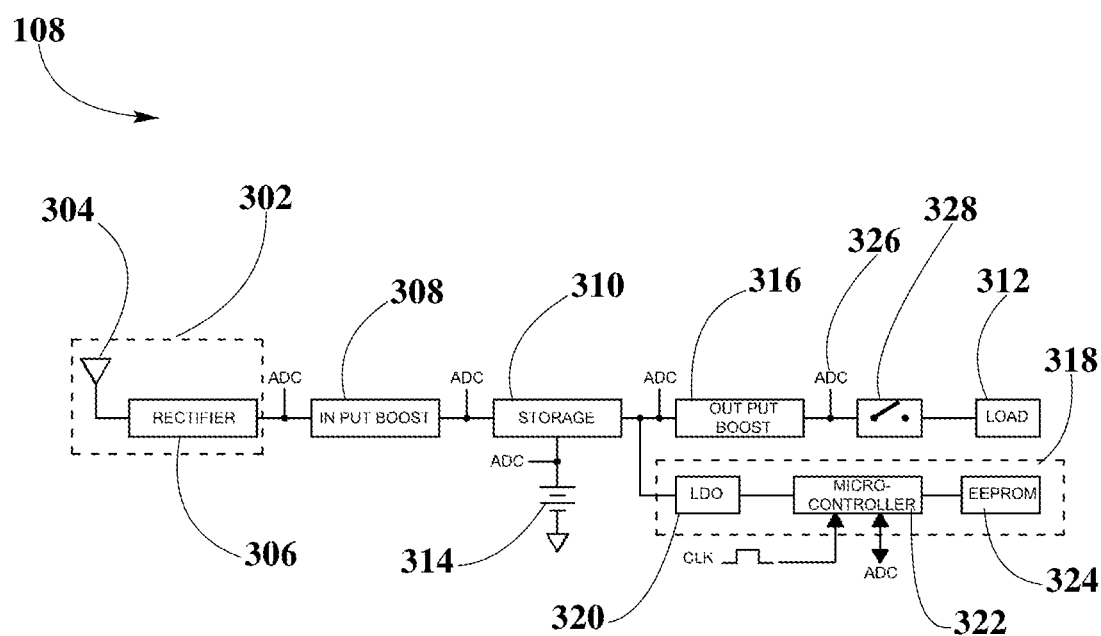
FIG. 3 shows a block diagram of a receiver which can be used for wireless powering or charging one or more electronic devices, according to an embodiment.

FIG. 3 shows a block diagram of receiver 108 which can be used for wireless powering or charging one or more electronic devices 110 as exemplified in wireless power transmission 100. According to some aspects of this embodiment, receiver 108 may operate with the variable power source generated from transmitted RF waves 104 to deliver constant and stable power or energy to electronic device 110. In addition, receiver 108 may use the variable power source generated from RF waves 104 to power up electronic components within receiver 108 for proper operation.

Receiver 108 may be integrated in electronic device 110 and may include a housing (not shown in FIG. 3) that can be made of any suitable material to allow for signal or wave transmission and/or reception, for example plastic or hard rubber. This housing may be an external hardware that may be added to different electronic equipment, for example in the form of cases, or can be embedded within electronic equipment as well.

Receiver 108 may include an antenna array 302 which may convert RF waves 104 or pockets of energy 106 into electrical power. Antenna array 302 may include one or more antenna elements 304 operatively coupled with one or more rectifiers 306. RF waves 104 may exhibit a sinusoidal shape within a voltage amplitude and power range that may depend on characteristics of transmitter 102 and the environment of transmission. The environment of transmission may be affected by changes to or movement of objects within the physical boundaries, or movement of the boundaries themselves. It is also affected by changes to the medium of transmission; for example, changes to air temperature or humidity. As a result, the voltage or power generated by antenna array 302 may be variable. As an illustrative embodiment, and not by way of limitation, the alternating current (AC) voltage or power generated by antenna element 304 from transmitted RF waves 104 or pocket of energy 106 may vary from about 0 volts or 0 watt to about 5 volts at 3 watts.

Antenna element 304 may include suitable antenna types for operating in frequency bands similar to the bands described for transmitter 102 from FIG. 2. Antenna element 304 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example electronic device 110. On the contrary, for devices with well-defined orientations, for example a two-handed video game controller, there might be a preferred polarization for antennas which may dictate a ratio for the number of antennas of a given polarization. Suitable antenna types may include patch antennas with heights from about ⅛ inches to about 6 inches and widths from about ⅛ inches to about 6 inches. Patch antennas may have the advantage that polarization may depend on connectivity, i.e. depending on which side the patch is fed, the polarization may change. This may further prove advantageous as receiver 108 may dynamically modify its antenna polarization to optimize wireless power transmission 100.

Rectifier 306 may include diodes or resistors, inductors or capacitors to rectify the AC voltage generated by antenna element 304 to direct current (DC) voltage. Rectifier 306 may be placed as close as is technically possible to antenna element 304 to minimize losses. In one embodiment, rectifier 306 may operate in synchronous mode, in which case rectifier 306 may include switching elements that may improve the efficiency of rectification. As an illustrative embodiment, and not by way of limitation, output of rectifier 306 may vary from about 0 volts to about 5 volts. Rectifier 306 is, e.g., a synchronous rectifier 501 as described with regard to FIG. 5, a phase-shifted synchronous rectifier 701 as described with regard to FIG. 7, or a frequency-division demultiplexing synchronous rectifier 801 as described with regard to FIG. 8.

An input boost converter 308 can be included in receiver 108 to convert the variable DC output voltage of rectifier 306 into a more stable DC voltage that can be used by components of receiver 108 and/or electronic device 110. Input boost converter 308 may operate as a step-up DC-to-DC converter to increase the voltage from rectifier 306 to a voltage level suitable for proper operation of receiver 108. As an illustrative embodiment, and not by way of limitation, input boost converter 308 may operate with input voltages of at least 0.4 volts to about 5 volts to produce an output voltage of about 5 volts. In addition, input boost converter 308 may reduce or eliminate rail-to-rail deviations. In one embodiment, input boost converter 308 may exhibit a synchronous topology to increase power conversion efficiency.

As the voltage or power generated from RF waves 104 may be zero at some instants of wireless power transmission 100, receiver 108 can include a storage element 310 to store energy or electric charge from the output voltage produced by input boost converter 308. In this way, storage element 310, through an output boost converter 316, may deliver continuous voltage or power to a load 312, where this load 312 may represent the battery or internal circuitry of electronic device 110 requiring continuous powering or charging. For example, load 312 may be the battery of a mobile phone requiring constant delivery of 5 volts at 2.5 watts.

Storage element 310 may include a battery 314 to store power or electric charge from the voltage received from input boost converter 308. Battery 314 may be of different types, including but not limited to, alkaline, nickel-cadmium (NiCd), nickel-metal hydride (NiHM), and lithium-ion, among others. Battery 314 may exhibit shapes and dimensions suitable for fitting receiver 108, while charging capacity and cell design of battery 314 may depend on load 312 requirements. For example, for charging or powering a mobile phone, battery 314 may deliver a voltage from about 3 volts to about 4.2 volts.

In another embodiment, storage element 310 may include a capacitor (not shown in FIG. 3) instead of battery 314 for storing and delivering electrical charge as required by the receiver. As a way of example, in the case of charging or powering a mobile phone, receiver 108 may include a capacitor with operational parameters matching the load device's power requirements.

Receiver 108 may also include output boost converter 316 operatively coupled with storage element 310 and input boost converter 308, where this output boost converter 316 may be used for matching impedance and power requirements of load 312. As an illustrative embodiment, and not by way of limitation, output boost converter 316 may increase the output voltage of battery 314 from about 3 or 4.2 volts to about 5 volts which may be the voltage required by the battery or internal circuitry of electronic device 110. Similarly to input boost converter 308, output boost converter 316 may be based on a synchronous topology for enhancing power conversion efficiency.

Storage element 310 may provide power or voltage to a communication subsystem 318 which may include a low-dropout regulator (LDO 320), a main system micro-controller 322, and an electrically erasable programmable read-only memory (EEPROM 324). LDO 320 may function as a DC linear voltage regulator to provide a steady voltage suitable for low energy applications as in main system micro-controller 322. Main system micro-controller 322 may be operatively coupled with EEPROM 324 to store data for the operation and monitoring of receiver 108. Main system micro-controller 322 may also include a clock (CLK) input and general purpose inputs/outputs (GPIOs).

In one embodiment, main system micro-controller 322 in conjunction with EEPROM 324 may run an algorithm for controlling the operation of input boost converter 308 and output boost converter 316 according to load 312 requirements. Main system micro-controller 322 may actively monitor the overall operation of receiver 108 by taking one or more power measurements 326 (ADC) at different nodes or sections as shown in FIG. 3. For example, micro-controller 322 may measure how much voltage or power is being delivered at rectifier 306, input boost converter 308, battery 314, output boost converter 316, communication subsystem 318, and/or load 312. Main system micro-controller 322 may communicate these power measurements 326 to load 312 so that electronic device 110 may know how much power it can pull from receiver 108. In another embodiment, main system micro-controller 322, based on power measurements 326, may control the power or voltage delivered at load 312 by adjusting the load current limits at output boost converter 316. Yet in another embodiment, a maximum power point tracking (MPPT) algorithm may be executed by main system micro-controller 322 to control and optimize the amount of power that input boost converter 308 can pull from antenna array 302.

In another embodiment, main system micro-controller 322 may regulate how power or energy can be drained from storage element 310 based on the monitoring of power measurements 326. For example, if the power or voltage at input boost converter 308 runs too low, then micro-controller 322 may direct output boost converter 316 to drain battery 314 for powering load 312.

Receiver 108 may include a switch 328 for resuming or interrupting power being delivered at load 312. In one embodiment, micro-controller 322 may control the operation of switch 328 according to terms of services contracted by one or more users of wireless power transmission 100 or according to administrator policies.

Half-Bridge Diode Rectifier of the Prior Art

Figure 4:
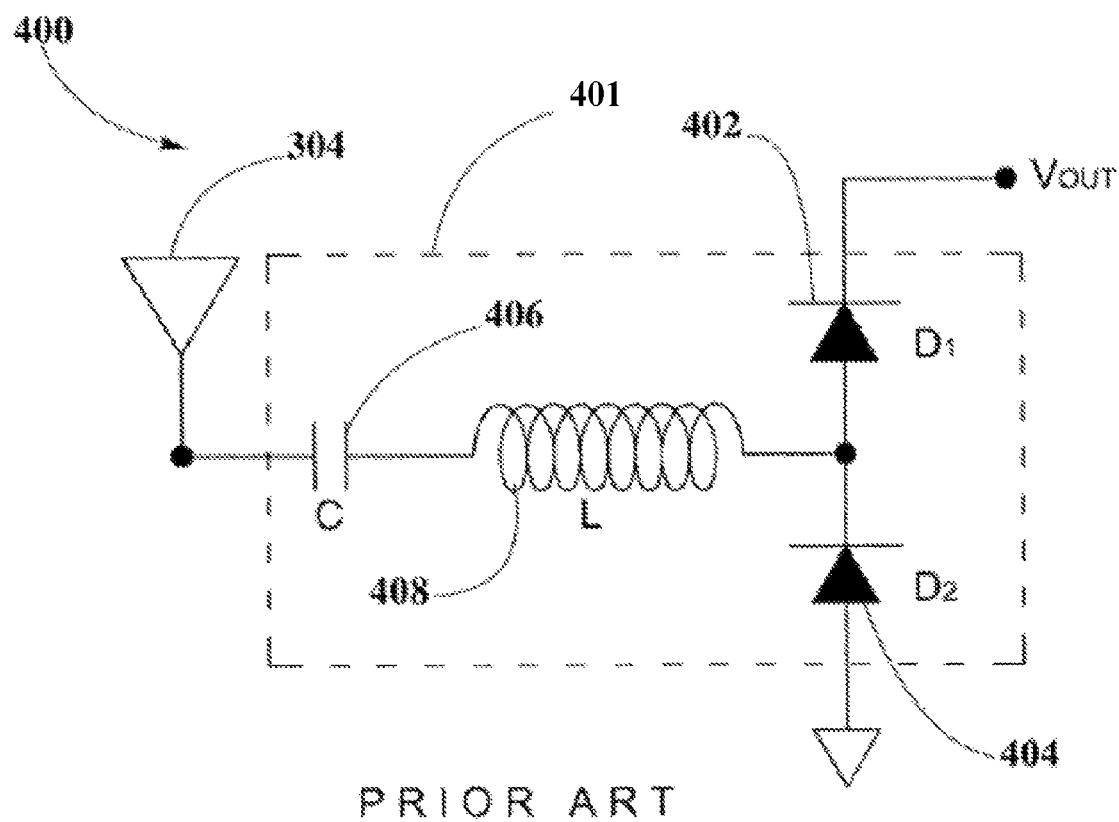
FIG. 4 represents a circuit diagram of a half-bridge diode rectifier of the prior art, according to an embodiment.

FIG. 4 represents a circuit diagram 400 of a half-bridge diode rectifier 401 of the prior art, according to embodiment shown in FIG. 3 as antenna array 302, including antenna element 304.

When an alternating RF signal is received from wireless transmitter 102, a direct voltage output $V_{OUT}$ may be drawn from the output terminals of the half-bridge diode rectifier 401.

Two diodes, $D_1$ and $D_2$, respectively identified as diode 402 and diode 404 are wired in series upstream and connected to output terminal. Antenna element 304 is connected in series to capacitor 406, which is connected in series to inductor 408, both acting as the resonant filter for the power signal being transferred from wireless transmitter 102 and received by antenna element 304 of wireless power receiver 108.

When the polarity of the alternating RF signal received may be positive, current flows through the first upstream diode $D_1$ and when the polarity of the alternating RF signal received is negative, current flows through second upstream diode $D_2$.

Half-bridge diode rectifiers, such as that shown in FIG. 4, may be used to produce an output with a fixed polarity that is independent of the polarity of the input. Half-bridge diode rectifiers may be used in AC-to-DC power converters, for example. Optionally, the output may be smoothed by a smoothing capacitor (not shown).

It may be noticed that as output voltages drop, the diode's forward voltage is more significant and may reduce conversion efficiency. Physical limitations prevent the forward voltage drop of diodes 402, 404 from being reduced to a level of voltage drop that may be less than about 0.3 V. Additionally, power is lost from each diode 402, 404 with each reversal of polarity. In high frequency power converters, where the polarity of the input signal may oscillate at frequencies of 100 kHz or more, such power losses may result in significant heating of the rectifier circuit and other components surrounding the rectifier. This situation may result in reduced reliability or failure of the rectifier circuit.

Control-Driven Synchronous Rectifier Circuit Topology

Figure 5:
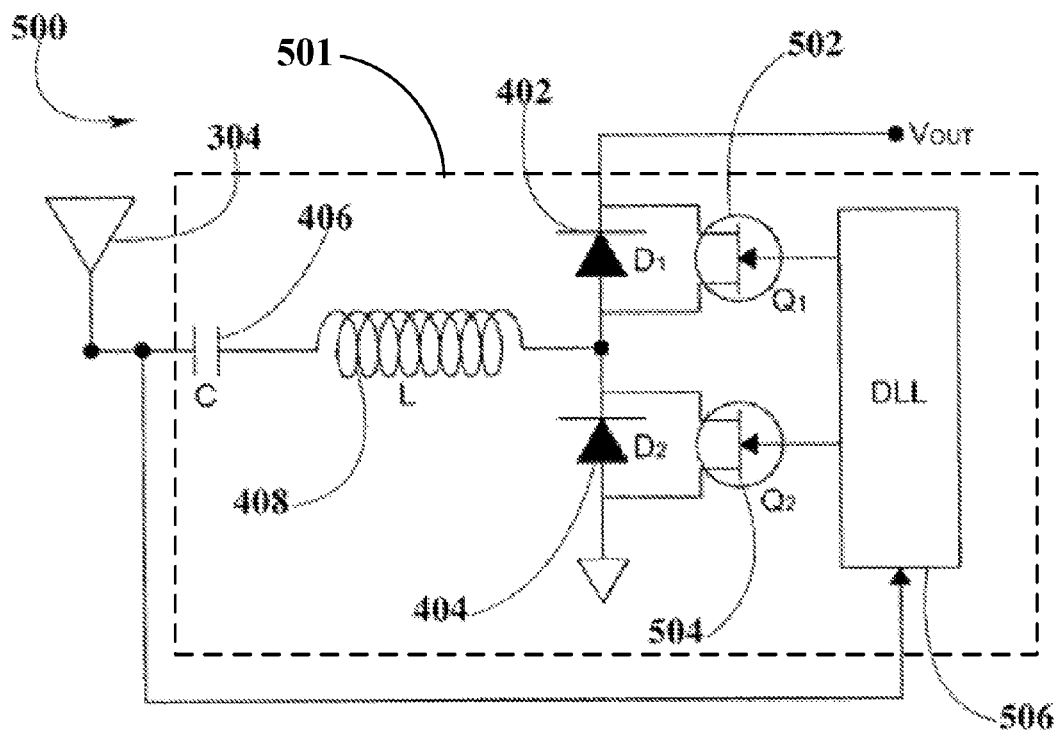
FIG. 5 illustrates a circuit diagram of a synchronous rectifier including a half-bridge diode-FET transistor rectifier and a delayed-lock loop clock for conduction control, according to an embodiment.

FIG. 5 illustrates a circuit diagram 500 of a synchronous rectifier 501 for wireless power receiver 108, connected to antenna element 304 and including a resonant filter that includes capacitor 406 and inductor 408, according to an embodiment. In this circuit, synchronous rectification may be enabled by a half-bridge rectifier configuration using diode 402 coupled to FET transistor 502 (Q1) and diode 404 coupled to FET transistor 504. This half-bridge rectifier configuration using synchronous rectification with coupled diode 402 and FET transistor 502, and coupled diode 404 and FET transistor 504 may be used to improve the efficiency limit which may result from using a half-bridge diode rectifier of prior art. As power conversion efficiency is primarily a function of the output voltage, output current, and the on-resistance and forward voltage drop of diodes 402, 404, adding FET transistors 502, 504 may provide significant improvement in power transfer from wireless transmitter 102 to wireless power receiver 108. Replacing a half-bridge diode rectifier of prior art with a synchronous rectifier 501 depicted in circuit diagram 500 may introduce a synchronous rectifier 501 possessing almost linear resistance characteristics and a lower forward-voltage drop. Consequently, the rectifier conduction loss may be reduced.

In this synchronous rectifier circuit topology, FET transistors 502, 504 may be driven by gate-drive signals derived from delayed-lock loop (DLL) clock 506 for conduction control of synchronous rectification of a plurality of high-frequency signals received from wireless transmitter 102. In present embodiment, the level of high-frequency signals may be within the 900 MHz, 2.4 GHz, and 5.7 GHz unlicensed bands.

Conduction times which may result by driving the half-bridge synchronous rectifiers from DLL clock 506 may reach a maximum conduction time of FET transistor 502 because it has no effect of the conduction time of current through diode 404 during dead time given that during dead time FET transistor 504 is in off state.

DLL clock 506 may be used to change the phase of the clock signal controlling FET transistors 502, 504 with a delay chain of delay gate signals which may be phase-locked depending on the frequency of the signal received by antenna element 304.

The precise gate-drive timing provided by DLL clock 506 may allow that when conduction through diode 402 may be applied or terminated, at the same instant conduction through diode 404 may be terminated or applied.

Circuit diagram 500 may be modified using a separate antenna element (not shown in FIG. 5) which is not included in antenna array 302. A modified synchronous rectifier circuit topology may be implemented by having DLL clock 506 directly connected to this second antenna element rather than deriving the control signal from the first antenna element 304 as shown in FIG. 5. The use of a separate antenna element connected to DLL clock 506 may prevent increasing the input impedance from antenna element 304 thus causing a reduction in the efficiency of the synchronous rectifier 501.

Switching Control Scheme

Figure 6:
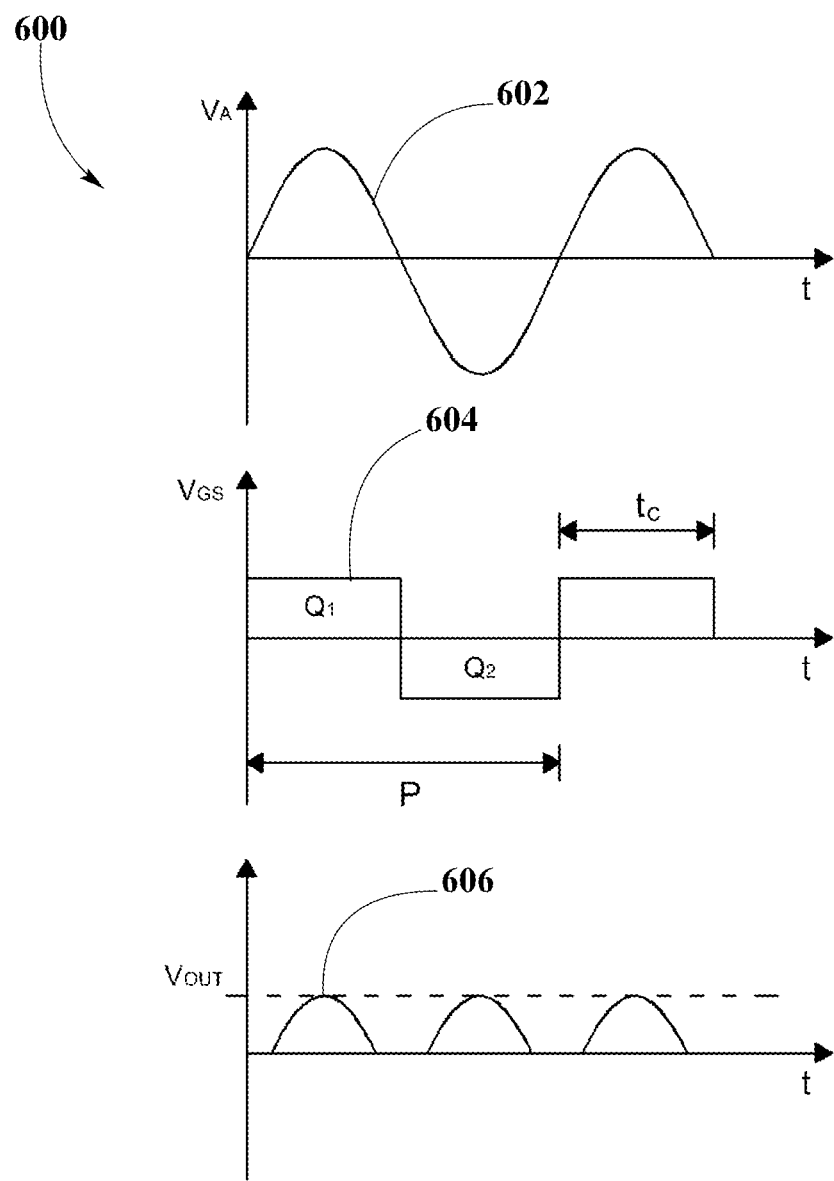
FIG. 6 corresponds to a graph of waveforms depicting input voltage received, gate drive control signal and output voltage during conduction times of a synchronous rectifier, according to an embodiment.

FIG. 6 corresponds to a graph of waveforms 600 depicting voltage received and conduction times of synchronous rectifier 501, for wireless power receiver 108 described in FIG. 3.

In FIG. 6, waveform 602 may represent the input voltage ($V_A$) received by antenna element 304; waveform 604 may illustrate the voltage of gate signals ($V_{GS}$) respectively applied to FET transistor 502, 504 to control conduction; and waveform 606 may show the output voltage ($V_{OUT}$) at the terminals of synchronous rectifier 501.

The gate-drive timing of SRs may not allow conduction of diodes 402, 404 of synchronous rectifier 501 except for the unavoidable conduction of diode 404 during the dead time. This may only be possible with a very precise gate-drive timing where the gate-drive for FET transistor 502 may be applied or terminated at the same instant the gate-drive of FET transistor 504 may be terminated or applied. In practical applications, any accidental, brief overlapping of the gate-drive signals that turn on both. SRs simultaneously may cause a short-circuit which may lower efficiency or, in severe cases, may cause failure of the synchronous rectifier. To avoid simultaneous conduction of SRs in practical applications, a delay between the gate-drive signals may be introduced. Since during the delay period no gate-drive signal is applied to the SRs, the diodes 402, 404 of the SRs are conducting. This not only increases conduction loss but also introduces reverse-recovery loss. Therefore, the performance of control-driven SRs is strongly dependent on the timing of the gate drive that may be enabled using DLL clock 506 as seen in circuit diagram 500. This may be seen in waveform 604 for which a positive gate signal (+$V_{GS}$) may be applied from DLL clock 506 to FET transistor 502 for a conduction time, $t_C$, during which FET transistor 504 is an off state. During FET transistor 502 conduction time, losses due to voltage drop may be practically the voltage drop losses of FET transistor 502, which are much lower than the voltage drop losses of diode 402, thus allowing current to flow through only diode 402 during the high conduction time. Similarly, since input voltage $V_A$ is from a monotonic power source, DLL clock 506 has to phase shift the current to turn on FET transistor 504 at an appropriate time once there is no current through diode 402, then allowing current to flow through diode 404 with a minimum level of voltage drop losses, which are mainly related to the voltage drop losses of FET transistor 504, during the high conduction time during the negative voltage of gate signal (−$V_{GS}$).

As seen in waveform 606, the switching control that may be provided by DLL clock 506 may result in a more significant level of power transfer to the other components in wireless power receiver 108. Waveform 606, when DLL clock 506 is operating, has a focus on high conduction time.

As seen, both SR gate drives may be regulated and, therefore, independent of input voltage variations or incoming power variations, so switching transitions remain constant over line and load. Since the output is controlled by the DLL clock 506, decisions may be made regarding when to turn off the SRs based on load current or output voltage. Optimizing proper SR gate drive timing in implementing control-driven SR often may require more accurate timing adjustment algorithms that can be designed discretely, but are much simpler when integrated into an integrated circuit solution, such as a DLL clock 506.

Synchronous Rectifier Circuit Topology Including Phase Shifters

Figure 7:
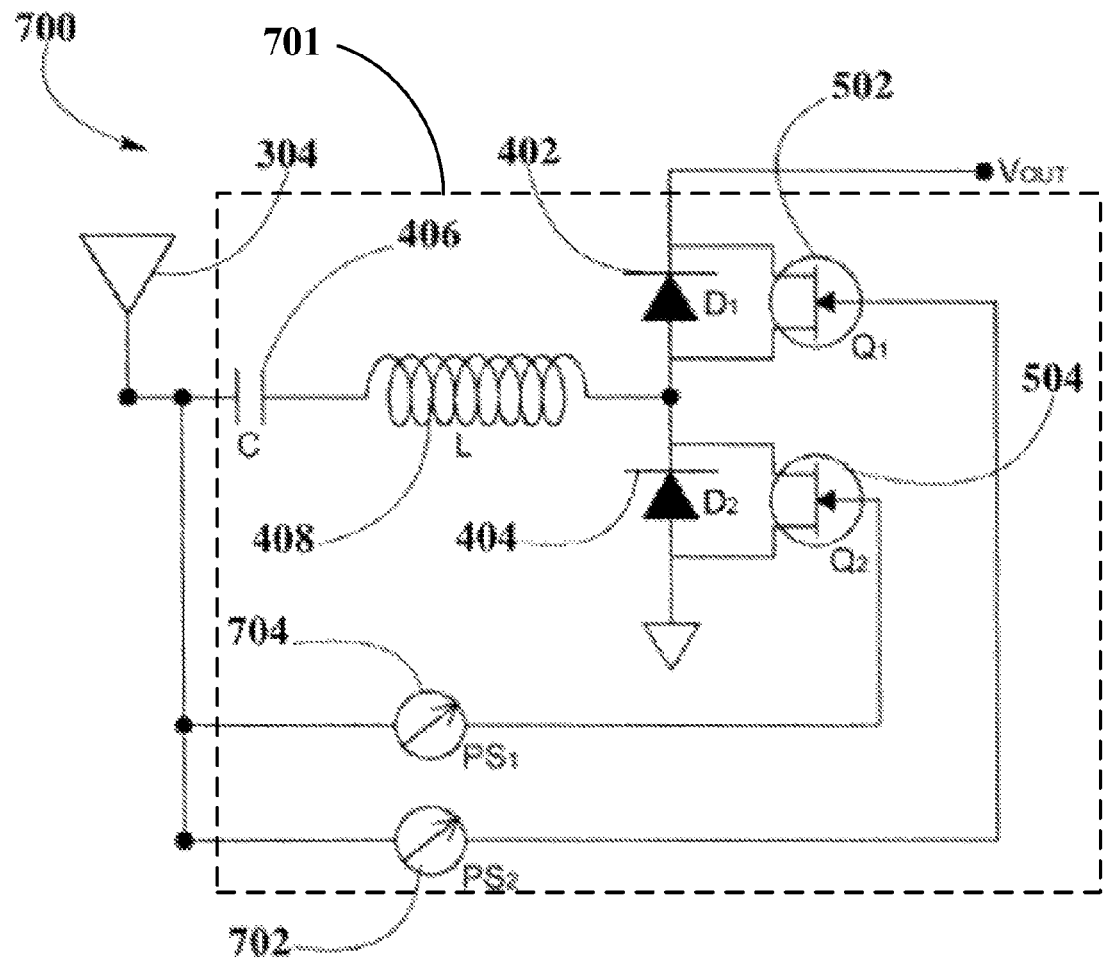
FIG. 7 depicts a circuit diagram of a synchronous rectifier including a half-bridge diode-FET transistor rectifier and phase shifters for conduction control, according to an embodiment.

FIG. 7 depicts a circuit diagram 700 of a phase-shifted synchronous rectifier 701 for wireless power receiver 108, connected to antenna element 304 and including resonant filter that includes capacitor 406 and inductor 408, according to an embodiment. In this circuit, synchronous rectification may be enabled by a half-bridge rectifier configuration using diode 402 coupled to FET transistor 502 (Q1) and diode 404 coupled to FET transistor 504. This half-bridge rectifier configuration using synchronous rectification with coupled diode 402 and FET transistor 502, and coupled diode 404 and FET transistor 504 may be used to improve the efficiency limit which may result from using a half-bridge diode rectifier of prior art. As power conversion efficiency is primarily a function of the output voltage, output current, and the on-resistance and forward voltage drop of diodes 402, 404, adding FET transistors 502, 504 may provide significant improvement in power transfer from wireless transmitter 102 to wireless power receiver 108. Replacing a half-bridge diode rectifier of prior art with a phase-shifted synchronous rectifier 701 depicted in circuit diagram 700 may introduce a synchronous rectifier possessing almost linear resistance characteristics and a lower forward-voltage drop. Consequently, the rectifier conduction loss may be reduced.

In this synchronous rectifier circuit topology, FET transistors 502, 504 may be driven by gate-drive signals derived from phase shifters 702, 704 for conduction control of synchronous rectification of a plurality of high-frequency signals received from wireless transmitter 102. In present embodiment, the level of high-frequency signals may be within the 900 MHz, 2.4 GHz, and 5.7 GHz unlicensed bands.

Phase shifters 702, 704 may be used to change the phase of the gate signal controlling FET transistors 502, 504 which may be phase-locked depending on the frequency of the signal received by antenna element 304.

The accurate gate-drive timing provided by phase shifters 702, 704 may allow that when conduction through diode 402 may be applied or terminated, at the same instant conduction through diode 404 may be terminated or applied.

Switching controlling for a phase-shifted synchronous rectifier 701 may start by developing two gate signal drives with a method of varying the phase relationship between them from 90° to 180°. Each gate signal drive from phase shifters 702, 704 may have an output which alternates with a 50% duty cycle to alternately drive FET transistor 502, 504. As the frequency of the incoming signal may change phase shifters 702, 704 may adapt to maintain the same level of current passing through diode 402 and diode 404, respectively, maintaining focus on high conduction times per switching control scheme previously described in FIG. 6, so that they run at constant frequency and the phase relationship between the two complimentary gate signal may enable that both FET transistors 502, 504 may turn on and off with zero voltage across them, resulting in close to lossless switching when proper timing may be provided.

Therefore, the performance of SRs driven by phase shifters 702, 704 is strongly dependent on the timing of the gate drive signals that may be enabled, as seen in circuit diagram 700. This may be seen in waveform 604 for which a positive gate signal ($+V_{GS}$) may be applied from phase shifter 702 to FET transistor 502 for a conduction time, $t_C$, during which FET transistor 504 is on off state. During FET transistor 502 conduction time, losses due to voltage drop may be practically the voltage drop losses of FET transistor 502, which are much lower than the voltage drop losses of diode 402, thus allowing only current to flow through diode 402 during the high conduction time. Similarly, since input voltage $V_A$ is from a monotonic power source, phase shifter 704 have to phase shift current to turn on FET transistor 504 at appropriate time once there is no current through diode 402, then allowing current to flow through diode 404 with a minimum level of voltage drop losses, which are mainly related to the voltage drop losses of FET transistor 504, during the high conduction time during the negative voltage of gate signal ($-V_{GS}$).

Synchronous Rectifier Circuit Topology Including Wavelength Links

Figure 8:
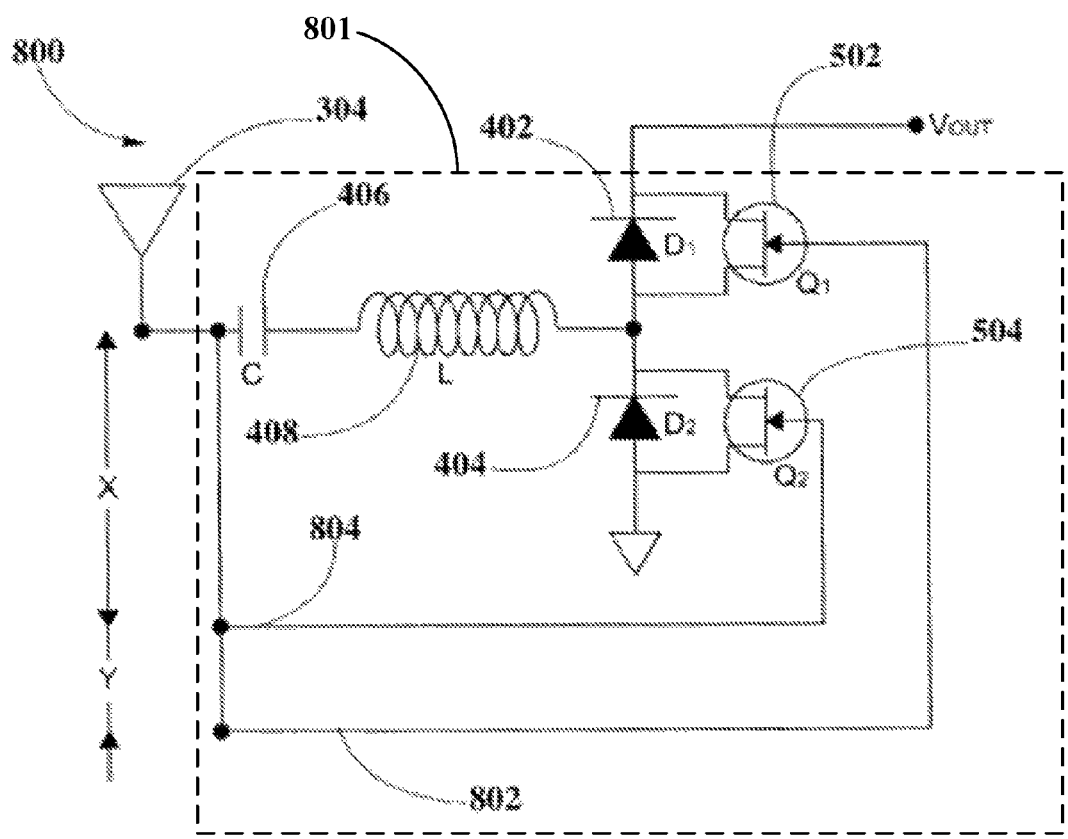
FIG. 8 shows a circuit diagram of a synchronous rectifier including a half-bridge diode-FET transistor rectifier and phase shifted wavelength lines for conduction control, according to an embodiment.

FIG. 8 depicts a circuit diagram 800 of a frequency-division demultiplexing synchronous rectifier 801 for wireless power receiver 108, connected to antenna element 304 and resonant filter including capacitor 406 and inductor 408. In this circuit, synchronous rectification may be enabled by a half-bridge rectifier configuration using diode 402 coupled to FET transistor 502 (Q1) and diode 404 coupled to FET transistor 504. This half-bridge rectifier configuration using synchronous rectification with coupled diode 402 and FET transistor 502, and coupled diode 404 and FET transistor 504 may be used to improve the efficiency limit which may result from using a half-bridge diode rectifier of prior art. As power conversion efficiency is primarily a function of the output voltage, output current, and the on-resistance and forward voltage drop of diodes 402, 404, adding FET transistors 502, 504 may provide significant improvement in power transfer from wireless transmitter 102 to wireless power receiver 108 Replacing a half-bridge diode rectifier of prior art with a frequency-division demultiplexing synchronous rectifier 801 depicted in circuit diagram 800 may introduce a synchronous rectifier possessing almost linear resistance characteristics and a lower forward-voltage drop. Consequently, the rectifier conduction loss may be reduced.

In this synchronous rectifier circuit topology, FET transistors 502, 504 may be driven by gate-drive signals derived from wavelength links 802, 804 for conduction control of synchronous rectification of a plurality of high-frequency signals received from wireless transmitter 102. In present embodiment, the level of high-frequency signals may be within the 900 MHz, 2.4 GHz, and 5.7 GHz unlicensed bands.

Wavelength links 802, 804 may be added as a frequency-division demultiplexing of the signal received by antenna element 304 from wireless transmitter 102. Wavelength links 802, 804 may be of different wavelength spacing in order to have the required phase shifting to enable switching control of FET transistor 502, 504 and providing the proper timing for current to flow through diodes 402, 404 focusing on high conduction times per switching control scheme previously described in FIG. 6, so that they run at constant frequency and the phase relationship between the two gate signals may enable that both FET transistors 502, 504 may turn on and off with zero voltage across them, resulting in close to lossless switching. Wavelength links 802, 804 may use spacing X and Y as shown in FIG. 8 within a range of about ¼ λ to ½ λ at about 5.7 GHz.

Therefore, the performance of SRs driven by wavelength links 802, 804 is strongly dependent on the timing of the gate drive signals that may be enabled, as seen in circuit diagram 800. This may be seen in waveform 604 for which a positive gate signal ($+V_{GS}$) may be applied from wavelength link 802 to FET transistor 502 for a conduction time, $t_C$, during which FET transistor 504 is on off state. During FET transistor 502 conduction time, losses due to voltage drop may be practically the voltage drop losses of FET transistor 502, which are much lower than the voltage drop losses of diode 402, thus allowing only current to flow through diode 402 during the high conduction time. Similarly, since input voltage $V_A$ is from a monotonic power source, wavelength link 804 have to phase shift current to turn on FET transistor 504 at appropriate time once there is no current through diode 402, then allowing current to flow through diode 404 with a minimum level of voltage drop losses, which are mainly related to the voltage drop losses of FET transistor 504, during the high conduction time during the negative voltage of gate signal ($-V_{GS}$).

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A receiver comprising:
   an antenna configured to receive power transmission waves; and
   a synchronous rectifier coupled to the antenna and configured to synchronously rectify an alternating current (AC) voltage of the power transmission waves to generate a direct current (DC) voltage, wherein the synchronous rectifier includes:
      a first rectifying diode that includes a first anode terminal and a first cathode terminal, wherein the first rectifying diode is configured to receive a first portion of the AC voltage that has a positive polarity;
      a second rectifying diode that includes a second anode terminal and a second cathode terminal, wherein the second rectifying diode is configured to receive a second portion of the AC voltage that has a negative polarity;
      a first transistor that includes a first source terminal, a first drain terminal, and a first gate terminal, wherein the first anode and the first cathode terminals are connected to the first transistor;
      a second transistor that includes a second source terminal, a second drain terminal, and a second gate terminal, wherein the second anode and the second cathode terminals are connected to the second transistor; and
      circuitry that is configured to introduce a timing delay between driving the first and second transistors;
   a first boost converter in electrical communication with the synchronous rectifier, the first boost converter configured to match an impedance of a load associated with the receiver.

2. The receiver of claim 1, wherein at least one of the first transistor or the second transistor is a field effect transistor (FET).

3. The receiver of claim 2, wherein the circuitry that is configured to introduce the timing delay between driving the first and second transistors includes a delay-locked loop coupled to at least one of the first transistor or the second transistor.

4. The receiver of claim 1, wherein the circuitry that is configured to introduce the timing delay between driving the first and second transistors includes at least one phase shifter.

5. The receiver of claim 1, further comprising an input boost converter coupled to the synchronous rectifier so that the synchronous rectifier is between the antenna and the input boost converter, wherein the input boost converter is configured to increase the DC voltage from the synchronous rectifier.

6. The receiver of claim 5, further comprising a storage element coupled to the input boost converter and configured to store power from the DC voltage boosted by the input boost converter.

7. The receiver of claim 6, wherein the first boost converter is an output boost converter coupled to the storage element.

8. The receiver of claim 7, further comprising a processor configured to control an operation of the input boost converter and the output boost converter in accordance with the load associated with the receiver.

9. The receiver of claim 1, wherein the circuitry that is configured to introduce the timing delay between driving the first and second transistors includes at least one wavelength link.

10. A method for receiving wireless power, the method comprising:
    receiving, by an antenna of a receiver, power transmission waves;
    rectifying, by a synchronous rectifier of the receiver, an alternating current (AC) voltage of the power transmission waves to generate a direct current (DC) voltage; and
    matching, by a first boost converter that is in electrical communication with the synchronous rectifier, an impedance of a load associated with the receiver, and wherein the synchronous rectifier includes:
       a first rectifying diode that includes a first anode terminal and a first cathode terminal, wherein the first rectifying diode is configured to receive a first portion of the AC voltage that has a positive polarity;
       a second rectifying diode that includes a second anode terminal and a second cathode terminal, wherein the second rectifying diode is configured to receive a second portion of the AC voltage that has a negative polarity;
       a first transistor that includes a first source terminal, a first drain terminal, and a first gate terminal, wherein the first anode and the first cathode terminals are connected to the first transistor;
       a second transistor that includes a second source terminal, a second drain terminal, and a second gate terminal, wherein the second anode and the second cathode terminals are connected to the second transistor; and
       circuitry that is configured to introduce a timing delay between driving the first and second transistors.

11. The method of claim 10, further comprising:
    introducing the timing delay between driving the first and second transistors in accordance with at least one of a received voltage and a frequency of the power transmission waves.

12. The method of claim 10, wherein the circuitry that is configured to introduce a timing delay between driving the first and second transistors includes at least one phase shifter.

13. The method of claim 10, further comprising:
increasing, by an input boost converter of the receiver, the DC voltage, wherein the input boost converter is coupled to the synchronous rectifier so that the synchronous rectifier is between the antenna and the input boost converter.

14. The method of claim 13, further comprising:
storing power, by a storage element of the receiver, from the DC voltage boosted by the input boost converter, wherein the storage element is coupled to the input boost converter.

15. The method of claim 14,
wherein the first boost converter is an output boost converter of the receiver, and the output boost converter is coupled to the storage element.

16. The method of claim 15, further comprising:
controlling, by a controller of the receiver, the increasing and the matching in accordance with the load associated with the receiver.

17. The method of claim 10, wherein introducing the timing delay between driving the first and second transistors includes frequency division demultiplexing the power transmission waves using at least one wavelength link.

18. The method of claim 10, wherein receiving the power transmission waves includes receiving a pocket of energy.

19. The method of claim 10, wherein the circuitry that is configured to introduce a timing delay between driving the first and second transistors includes a delay-locked loop coupled to at least one of the first transistor or the second transistor.

* * * * *